(12) United States Patent
Dirksing et al.

(10) Patent No.: US 6,277,458 B1
(45) Date of Patent: *Aug. 21, 2001

(54) RELEASE STRIP WITH PARTIBLE BREAK TO FACILITATE

(75) Inventors: Robert Stanley Dirksing, Cincinnati; Paul Albert Sagel, Mason, both of OH (US)

(73) Assignee: The Procter & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,171

(22) Filed: Mar. 15, 1999

(51) Int. Cl.$^7$ ........................................................ B32B 7/06
(52) U.S. Cl. ............................ 428/42.3; 428/43; 428/40.1
(58) Field of Search ........................... 428/43, 136, 42.3, 428/40.1, 42.2; 283/81; 242/521

(56) References Cited

U.S. PATENT DOCUMENTS

| | | | | |
|---|---|---|---|---|
| 2,994,362 | * | 8/1961 | Hall | 428/40.1 |
| 5,631,055 | * | 5/1997 | Vines et al. | 428/40.1 |

* cited by examiner

*Primary Examiner*—Alexander S. Thomas
(74) *Attorney, Agent, or Firm*—James C. Vago; Angela Maire Stone; Karen F. Clark (57) ABSTRACT

The present invention relates to a laminated structure comprising an adhesive coated strip which is mounted upon a release strip wherein the release strip includes a partible break and wherein the release strip further includes a tab. Deflection of the release strip tab in a direction away from the adhesive coated strip generates a partial separation of the release strip tab from the general plane of the release strip at the partible break causing an edge of the adhesive coated strip to be exposed for grasping by the user. The present invention also relates to methods for removal of an adhesive coated strip from the release strip.

26 Claims, 4 Drawing Sheets

RELEASE STRIP WITH PARTIBLE BREAK TO FACILITATE

FIELD OF THE INVENTION

The present invention relates to laminated structures comprising adhesive coated strips mounted upon release strip; and more particularly, to such structures having release strips with means to facilitate removal of the adhesive coated strip.

BACKGROUND OF THE INVENTION

Adhesive coated strips such as labels, bandages, transdermal patches, and the like are commonplace. Prior to application to a desired surface by a user, the adhesive coated strips are generally provided with the adhesive coating protected from contamination and inadvertent attachment to itself or to an undesired surface by some sort of treated release paper or plastic release film, which will subsequently be referred to as the release strip. Prior to use, the user separates the release strip from the adhesive coated strip, exposing the adhesive coating The strip is then ready for the intended adhesive strip application. However, separating the adhesive coated strip from the release strip can be a frustrating process and may lead to damage to the adhesive coated strip, especially at the edge where the user attempts to initiate the separation, typically employing a fingernail or sharp instrument. This is often the case with pressure sensitive adhesive products such as labels and, recently, self adhering postage stamps. The quality and ease of removal of the strip from the release material is often a function of the condition of the user's fingerails.

In situations where a particular adhesive coated strip is stiffer than its adjoining release stip, the release strip may be sharply creased near an edge of the adhesive coated strip causing the that edge of the adhesive coated strip to separate away from the release strip. The user may then grasp the exposed edge of the adhesive coated strip and continue to separate the same from the release strip.

However, as is often the case, the release strip is stiffer than the adhesive coated strip. To address this problem, manufactures of some adhesive coated strips include means to facilitate separation of the adhesive coated strip from the release strip. For example, common home bandages have two plastic film or coated paper release strips that cover both the adhesive and the gauze portion of the bandage. The two release strips typically overlap near the center of the bandage, over the gauze portion where there is no or substantially less adhesive coating. The release strips may further be provided with tabs to further enhance acquisition of the ends of the release strips by the fingers of the user. The user is thus able to acquire the interior ends of the release strips and separate the same from the bandage for application to, for example, a wound site.

Another means that is used to facilitate removal of an adhesive coated stip from a release strip is to process the release strip to include lines of frangibility. This, technique is common with pressure sensitive adhesive labels. To remove the label from the frangible line release strip, a user folds the adhesive coated label and release strip laminate at an indicated line of frangibility causing the release strip to crack along the indicated line, thus presenting edges of the release strip which the user may grasp to further remove the release strip from the pressure sensitive adhesive label.

Other applications of adhesive coated strips wherein the adhesive coating is a relative thick viscous and tacky gel have been introduced into common use. For example, such applications include transdermal patches, electrocardiogram electrodes, and teeth whitening strips. For comfort, such strips are preferably thin films so as to be compliant with the attached surface. This creates a special challenge for removal of such adhesive coated strips from their respective release strips.

Another issue is the question of disposal of the residual release strip. Means that facilitate removal of the adhesive coated strips from the release strip often result in multiple pieces of release strip, some of which may be small and easily misplaced. As should be obvious, in medical circumstances and with oral applications, the number of pieces and physical size of residual release strip is an important issue. It is preferred to reduce the number of such pieces and to avoid small pieces.

What is needed is a simple low cost means that facilitates removal of the adhesive coated strip from the release strip, wherein the release strip is used to provide protection to the adhesive coating prior to application of the adhesive coated strip, e.g., a bandage, transdermal patch, or whitening strip for teeth, and wherein the release strip is maintained in a unitary condition after removal of the adhesive coated strip. It is further needed that the means for facilitating removal of an adhesive coated strip from its adjoining release strip be conducive to efficient converting processes.

It is therefore an object of the present invention to provide an improved release strip which facilitates its removal from an adhesive coated strip and for such release strip to retain a unitary condition after removal from the adhesive coated strip.

SUMMARY OF THE INVENTION

The present invention relates to a laminated structure comprising an adhesive coated strip which is laminated upon a release strip. The adhesive coated strip is substantially planar and has a peripheral edge. The release strip has an outside edge, a partible break and a deflectable tab. The partible break extends from a point on the outside edge of the release strip to beyond at least one peripheral edge of the adhesive coated strip to an interior point on the release strip. The deflectable tab is formed by the partible break. The release strip will remain contiguous about the partible break subsequent to removal of the adhesive coated article. Deflection of the tab in a direction away from the adhesive coated strip generates a partial separation of the release strip tab from the general plane of the release strip at the partible break. This causes a portion of the peripheral edge of the adhesive coated strip to form a leading edge which is exposed for grasping by the user. The present invention may also be described wherein the release strip has an outside edge and a partible break. The outside edge of the release strip extends outwardly beyond the peripheral edge of the adhesive coated strip. The partible break extends inwardly from an edge of the release strip and beyond at least one peripheral edge of the adhesive coated strip to an interior point of the release strip. The partible break will be oriented such that when a rotational force is exerted on the outside edge, a portion of the adhesive coated strip separates from the release strip to form, a leading edge from a portion of the peripheral edge. This leading edge is graspable by a user.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DESCRIPTION OF TIRE PREFERRED EMBODIMENT

The present invention relates to laminated structures comprising adhesive coated strips mounted upon release strip; and more particularly, to such structures having release strips with means to facilitate removal of the adhesive coated strip.

By lamiated structures is meant items comprising a multiplicity of layers of various materials such as plastic films, papers, cloths, coatings, gels, adhesives, etc., wherein the layers are securely or releasably affixed to adjoining layers. The layers may be affixed by an adhesive coating or other means. The adhesive coating may be comprised of any substance which provides adhesive attachment, such as carboxypolymethylene. The adhesive coated strip may be mounted, placed, or laminated upon the release stip.

The term adhesive coated strips refers to a patches, labels, film strips, or the like, fabricated from such materials as plastic films, papers, cloths, polymers, wovens, non-wovens, foil, rubber, and combinations thereof. The strip will have an adhesive coating that enables such patches, labels, film strips, or the like, to be adhesively attached to a desired surface. The adhesive coated strip may be of any size suitable for use. Typically, the adhesive coated strip will be relatively thin, such as less than about 2 mm thick. The adhesive coated strip may be flat, textured, embossed, or contain one or more pockets. The adhesive coated strip is substantially planar in shape or generally flat. The adhesive coated strip will contain a peripheral edge around the outside of the strip. This peripheral edge may be described as the outside edge of the adhesive coated strip or as the border.

The term release strips refers to a layer of plastic film, coated paper, polyethylene, polyester, or other material. The release liner may be any material which exhibits less affinty for the adhesive than the adhesive exhibits for itself and for the strip of material. The release strip may be comprised of any material which is flexible. The release strip is releasably affixed to the adhesive coating to protect the adhesive coating and any possibly as active agent, either about the adhesive coating or within the matrix of the adhesive coating, prior to application to a desired surface. Such release strips may further be treated, at least on the side adjacent to the adhesive coating with agents such as silicones, fluorocarbons, wax, polyester, or other non-stick tote materials. This will further enhance ease of separation of the release strips from the adhesive coating.

The release strip is comprised of a tab and general body. The release strip is substantially planar. Generally, the release strip is slightly larger than or extends beyond one or more of the perpheral edges of the adhesive coated strip. The tab is formed by the partible break in the release strip. The tab is of any size that is graspable by the user's fingers. Typically, the tab will be from about 2 mm wide to about 10 mm wide. The tab is always equal to or less than 50% of the length of the release strip. The width of the tab is from the point where the partible break intersects the outside edge of the release strip to the closest corner or adjacent edge of the release strip. The tab will be smaller than the general body of the release strip. The tab is described as a deflectable tab as it is deflected away from the adhesive coated strip by the user.

The partible break may either be scored fully through the release strip or be a line of weakened strength enabling a tear along the partible score cuts in the release strip. The partible break may be comprised of a segment that is scored fully through the release strip and a segment that is a weakened strength enabling a tear along the partible score cuts. There will be one or more partible breaks in each release strip. The partible break may begin at any of the outside edges of the release strip. For example, it may begin at the outside edge along the shorter or longer side of the release liner. Depending upon the specific location of the tab, it is possible that a tab may then be formed on either side of the partible break. The partible break will end at an interior point. The interior point will always be located within the outside edge of the release strip. The, interior point may or may not be located within the peripheral edges of the adhesive coated strip, depending upon the length of the partible break. The partible break always extends from an outside edge of the release strip and beyond at least one peripheral edge of the adhesive coated strip. The partible break may extend through two peripheral edges of the adhesive coated strip.

The release strip and adhesive coated strip both contain edges. Typically, the use of the term edge is used to describe the outside edge of either the adhesive coated strip or of the release strip. The outside edge of the adhesive coated strip is described as the peripheral edge. The term leading edge is used to describe the edge on the adhesive coated strip which is graspable by the user. This is the edge of the adhesive coated strip which is formed from a portion of the peripheral edge when the tab is deflected away from the adhesive coated stip. The tab may be deflected away by a rotational force exerted on an outside edge of the release strip. This will result in a partial separation of the tab in the release strip from the general plane of the release strip. This leading edge of the adhesive coated strip is now exposed for grasping by the user. This will facilitate removal of the adhesive coated strip from the release strip.

The release strip and adhesive coated strip may each be of any desired size or shape. The release strip and adhesive coated strip do no have to be the same size or shape. The release strip is at least as large of the adhesive coated strip or larger. The strips may be of substantially rectangular shape, circular shape, triangular shape, trapezoidal shape, or any other desired shape. For example, a rectangular shaped strip will have four sides and four corners. The strips will have one or more sides.

Figure 1:
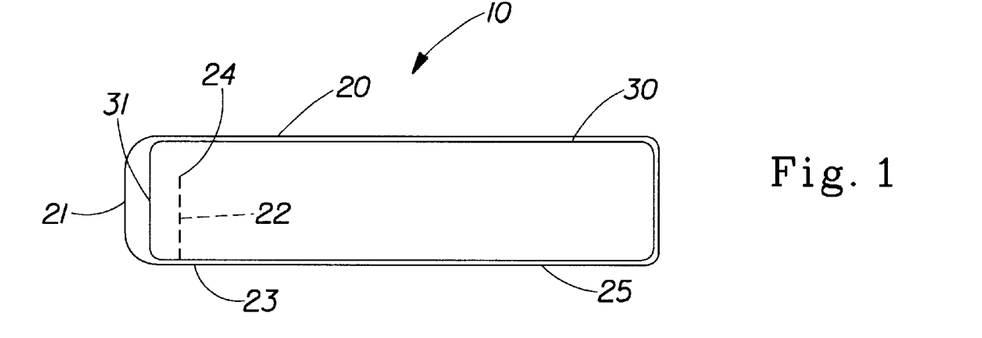
FIG. 1 is a top plan view of a preferred embodiment a laminated structure of the present invention.

Referring now to the drawings, and more particularly to FIG. 1, there is shown a first preferred embodiment of the laminated structure of the present invention, which is generally indicated as 10. Embodiment 10 represents a laminated structure of the present invention comprising release strip 20 and adhesive coated strip 30. Release strip 20 further comprises tab 21 which extends beyond the peripheral edge 31 of the adhesive coated strip 30 and is formed by patble break 22. Partible break 22 extends from the outside edge 23 of release strip 20 to interior point 24. Interior point 24 is so located within the bounds of release strip 20 such that tab 21 remains contiguous with the general body 25 of release strip 20. Interior point 24 is located inside of the peripheral edges 31 of the adhesive coated strip 30.

Figure 2:
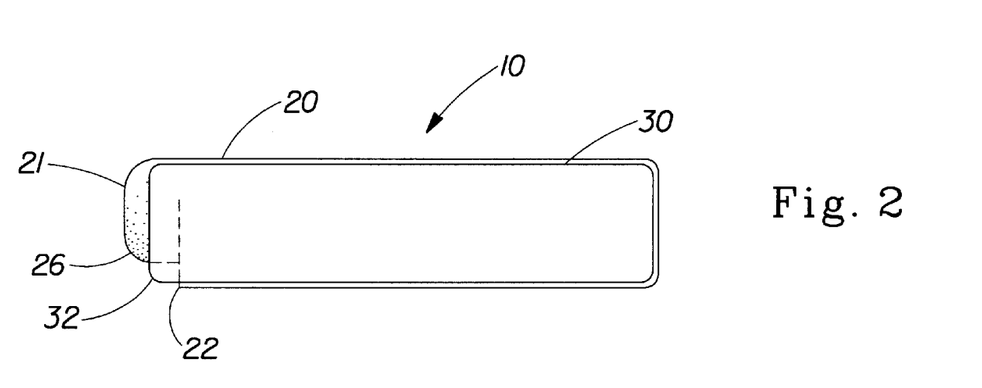
FIG. 2 is a top plan view of laminated structure of the embodiment of FIG. 1, wherein a tab, extending from the outside edge of the release strip, is shown deflected downward along a partible break away from the adjoining adhesive coated strip so as to expose an edge of the adhesive coated strip.

In FIG. 2, there is shown portion 26 of tab 21 deflected downward along partible break 22 away from the adjoining adhesive coated strip 30 so as to expose leading edge 32 of adhesive coated strip 30 and to provide leading edge 32 for grasping by the user of laminated structure 10 in order to facilitate separation of adhesive coated strip 30 from release strip 20.

Figure 3:
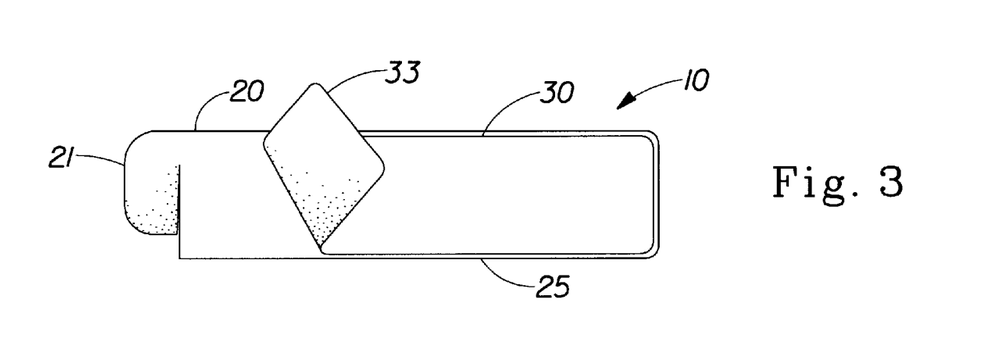
FIG. 3 is a top plan view of laminated structure of the embodiment of FIG. 1, wherein the adhesive coated strip is shown being separated from the adjoining release strip.

In FIG. 3, there is shown portion 33 of adhesive strip 30 separated from release strip 20. In use, the user of laminated structure 10 would continue to fully separate adhesive strip 30 from release strip 20 for application to a desired surface. Subsequent to removal of adhesive strip 30 from release strip 20, tab 21 remains contiguous with tile generally body 25 of release strip 20. The partible break in the release strip feature provides only one piece of which to dispose and, perhaps more importantly, elimination of small pieces which may be injurious in medical and oral applications.

Furthermore, producing partible break 22 is amenable to manufacturing systems, requiring simple registered score line in the release paper, film, or like during or prior to the converting process used to produce laminated structure 10. Partible break 22 may either score fully through release strip 20 or be a line of weakened strength enabling a tear along partible break 22.

Figure 4:
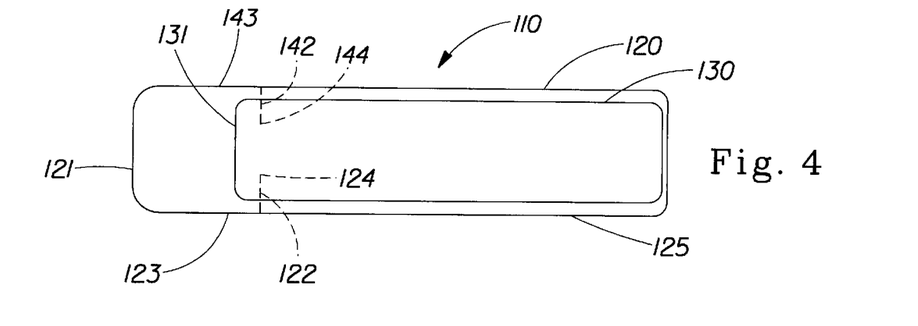
FIG. 4 is a top plan view of another preferred embodiment a laminated structure of the present invention wherein a multiplicity of partible breaks are provided.

Referring to FIG. 4, there is shown another preferred embodiment of the laminated structure of the present invention, which is generally indicated as 110. Embodiment 110 represents a laminated structure of the present invention comprising release strip 120 and adhesive coated strip 130. Release strip 120 further comprises tab 121 which extends beyond the peripheral edge 131 of the adhesive coated strip 130, a first partible break 122, and a second partible break 142. Partible break 122 extends from outside edge 123 of release strip 120 to interior point 124. Partible break 142 extends from outside edge 143 of release strip 120 to interior point 144. Interior points 124 and 144 are so located within the bounds of release strip 120 such that tab 121 remains contiguous with the general body 125 of release strip 120.

Figure 5:
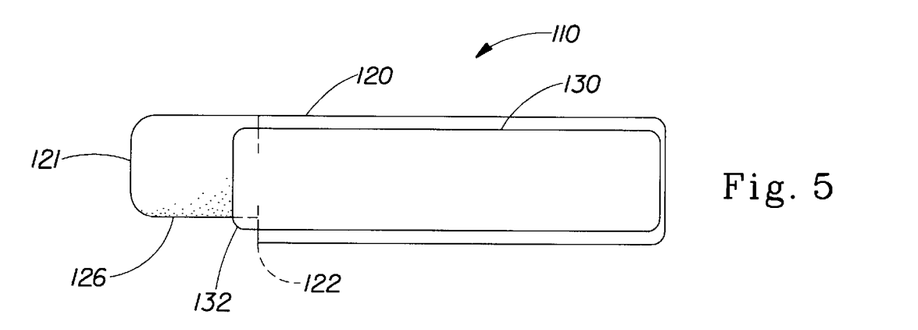
FIG. 5 is a top plan view of laminated structure of the embodiment of FIG. 4, wherein a tab is shown deflected downward along one of a multiplicity of partible breaks away from the adjoining adhesive coated strip so as to expose an edge of the adhesive coated strip.

In FIG. 5, there is shown portion 126 of tab 121 deflected downward along partible break 122 away from the adjoining adhesive coated strip 130 so as to expose peripheral edge 132 of adhesive coated strip 130 and to provide leading edge 132 for grasping by the user of laminated structure 110 in order to facilitate separation of coated strip 130 from release strip 120.

Figure 6:
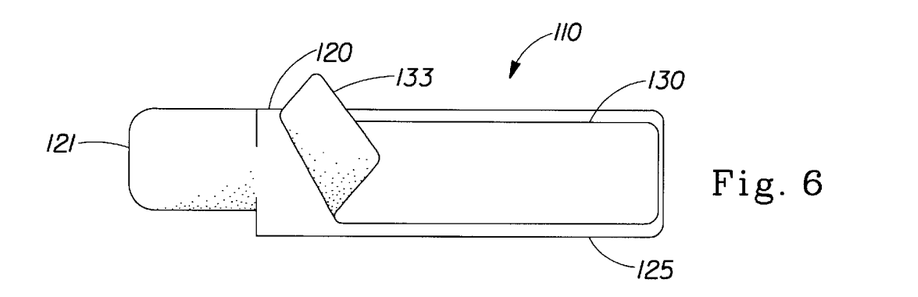
FIG. 6 is a top plan view of laminated structure of the embodiment of FIG. 4 wherein the adhesive coated strip is shown being separated from the adjoining release strip.

In FIG. 6, there is shown portion 133 of adhesive strip 130 separated from release strip 120. In use, the user of laminated structure 110 would continue to fully separate adhesive strip 130 from release strip 120 for application to a desired surface. Subsequent to removal of adhesive strip 130 from release strip 120, tab 121 remains contiguous with the generally body 125 of release strip 120.

Figure 7:
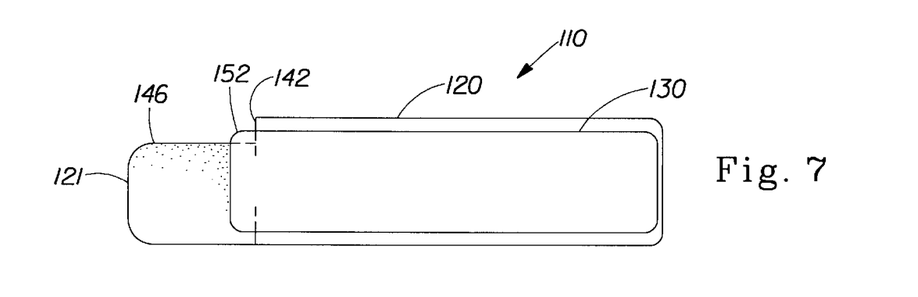
FIG. 7 is a top plan view of laminated structure of the embodiment of FIG. 4, wherein a tab is shown deflected downward along a second of a multiplicity of partible breaks away from the adjoining adhesive coated strip so as to expose an edge of the adhesive coated strip.

In FIG. 7, there is shown portion 146 of tab 121 deflected downward along partible break 142 away from the adjoining adhesive coated strip 130 so as to expose leading edge 152 of adhesive coated strip 130 and to provide leading edge 152 far grasping by the user of laminated structure 110 in order to facilitate separation of adhesive coated strip 130 from release strip 120. Subsequent removal of adhesive strip 130 from release strip 120 is similar as discussed in relation to partible break 122.

Partible breaks 122 and 142 may either be scored fully through release strip 120 or be a line of weakened strength enabling a tear along partible breaks 122 and 142. Embodiment 110 of the present invention provides easy access to exposed leading edges 132 or 152 so that ease of separation adhesive coated strip 130 from release strip 120, is afforded to right and left handed user equally.

Figure 8:
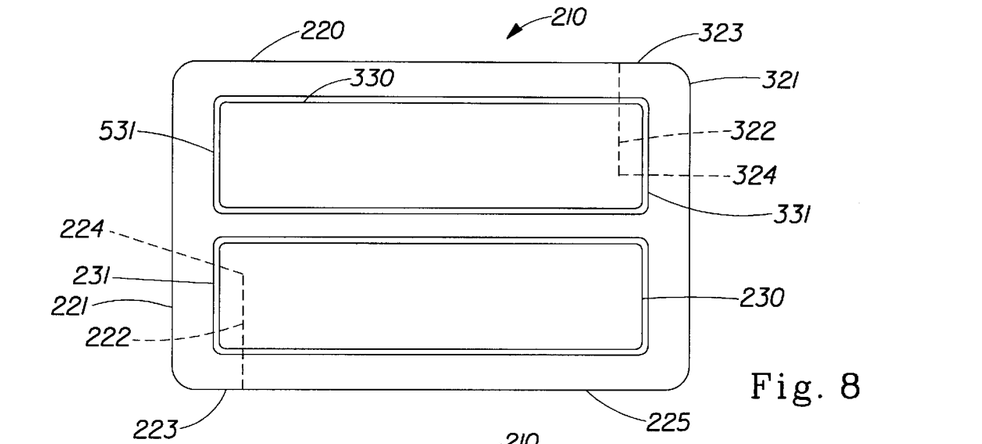
FIG. 8 is a top plan view of still another preferred embodiment a laminated structure of the present invention wherein a multiplicity of adhesive coated strips are mounted upon a release strip.

Referring now to FIG. 8, there is shown a yet another preferred embodiment laminated structure of the present invention, which is generally indicated as 210. Embodiment 210 represents a laminated structure of the present invention comprising release strip 220 and adhesive coated strips 230 and 330. Release strip 220 further comprises tabs 221 and 321 which extends past the peripheral edges 231 and 331 of the adhesive coated strips 230 and 330 respectively, and partible breaks 222 and 322. Partible breaks 222 and 322 extend from outside edges 223 and 323 of release strip 220, respectively, to interior points 224 and 324, respectively. Interior points 224 and 324 are located within the bounds of release strip 220 such that tab 221 and 321, respectively, remain contiguous with the general body 225 of release strip 220.

Figure 9:
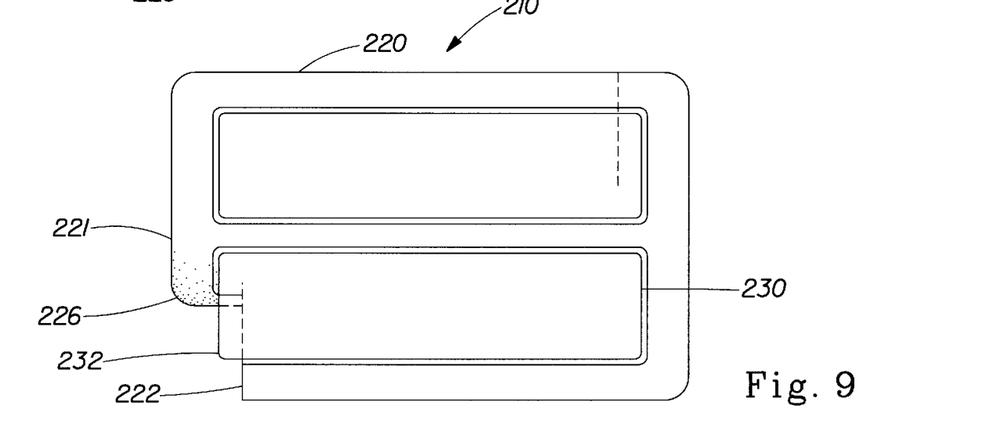
FIG. 9 is a top plan view of laminated structure of the embodiment of FIG. 8 wherein a tab extending from the outside edge of the release strip and deflected downward along one of a multiplicity of partible breaks away from the adjoining adhesive coated strip so as to expose an edge of the adhesive coated strip.

In FIG. 9, there is shown portion 226 of tab 221 deflected downward along partible break 222 away from the adjoining adhesive coated strip 230 so as to expose leading edge 232 of adhesive coated strip 230 and to provide leading edge 232 for grasping by the user of laminated structure 210 in order to facilitate separation of adhesive coated strip 230 from release strip 220.

Figure 10:
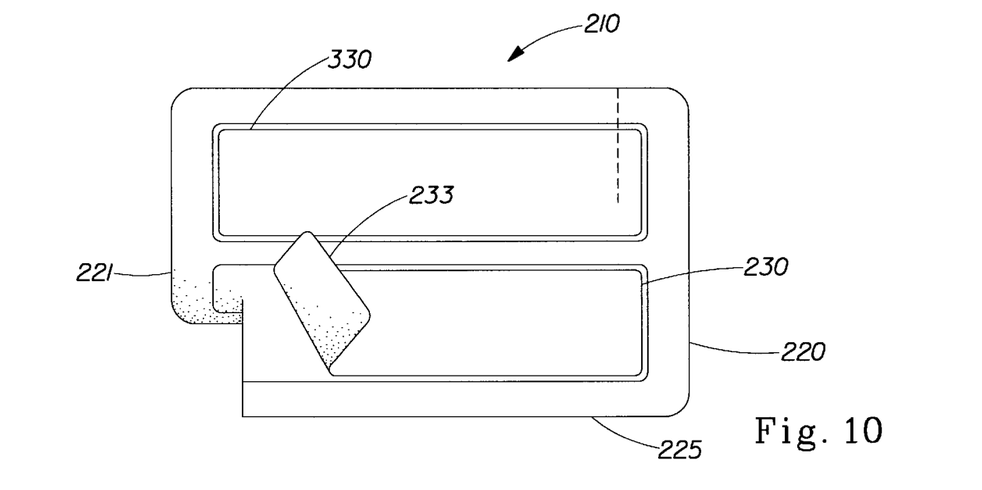
FIG. 10 is a top plan view of laminated structure of the embodiment of FIG. 8 wherein one of a multiplicity of adhesive coated strips is shown being separated from the adjoining release strip.

In FIG. 10, there is shown portion 233 of adhesive strip 230 separated from release strip 220. In use, the user of laminated structure 210 would continue to fully separate adhesive strip 230 from release strip 220 for application to a desired surface. Subsequent to removal of adhesive strip 230 from release strip 220, tab 221 remains contiguous with the generally body 225 of release strip 220. In like manner, adhesive coated strip 330 may be removed from release strip 220.

Figure 11:
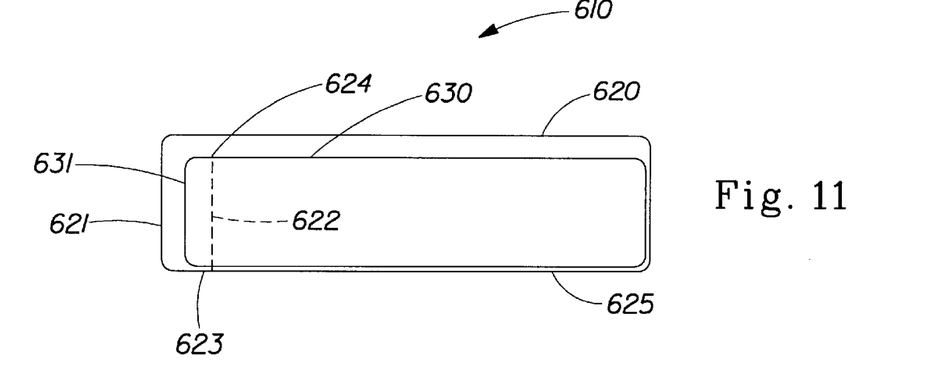
FIG. 11 is a top plan view of an embodiment a laminated structure of the present invention.

In FIG. 11, there is shown an embodiment of the laminated structure of the present invention, which is generally indicated as 610. Embodiment 610 represents a laminated structure of the present invention comprising release strip 620 and adhesive coated strip 630. Release strip 620 further comprises tab 621 which extends beyond the peripheral edge 631 of the adhesive coated strip 630, and partible break 622. Partible break 622 extends from the outside edge 623 of release strip 620 to interior point 624. Interior point 624 is so located within the bounds of release strip 620 such that tab 121 remains contiguous with the general body 625 of release strip 620. Interior point 624 is located outside of the peripheral edges 631 of the adhesive coated strip 630.

Figure 12:
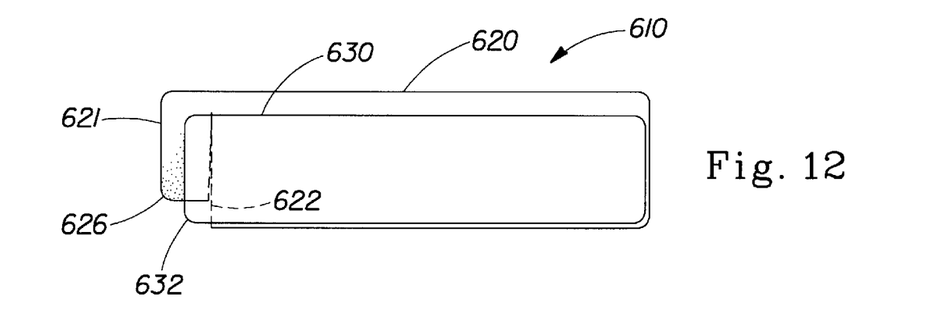
FIG. 12 is a top plan view of laminated structure of the embodiment of FIG. 11, wherein a tab, extending from the outside edge of the release strip and past the peripheral edges of the adhesive coated strip, is shown deflected downward along a partible break away from the adjoining adhesive coated stip so as to expose an edge of the adhesive coated stip.

In FIG. 12, there is shown portion 626 of tab 621 deflected downward along partible break 622 away from the adjoining adhesive coated strip 630 so as to expose leading edge 632 of adhesive coated strip 630 and to provide leading edge 632 for grasping by the user of laminated structure 610 in order to facilitate separation of adhesive coated strip 630 from release strip 620.

Figure 13:
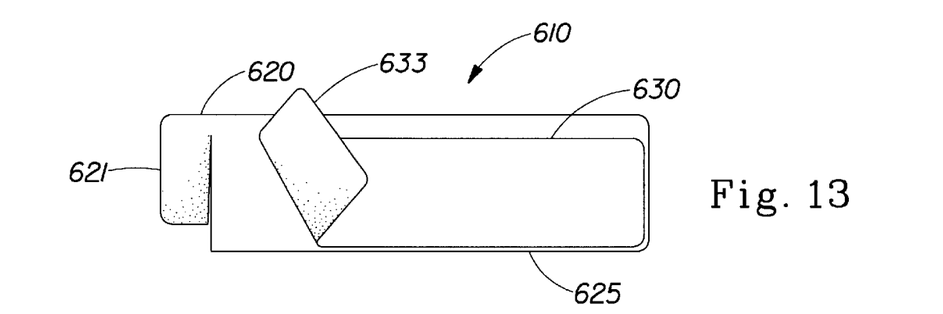
FIG. 13 is a top plan view of laminated structure of the embodiment of FIG. 11, wherein the adhesive coated strip is shown being separated from the adjoining release strip.

In FIG. 13, there is shown portion 633 of adhesive strip 630 separated from release strip 620. In use, the user of laminated structure 610 would continue to fully separate adhesive strip 630 from release strip 620 for application to a desired surface. Subsequent to removal of adhesive strip 630 from release strip 620, tab 621 remains contiguous with the generally body 625 of release strip 620.

Figure 14:
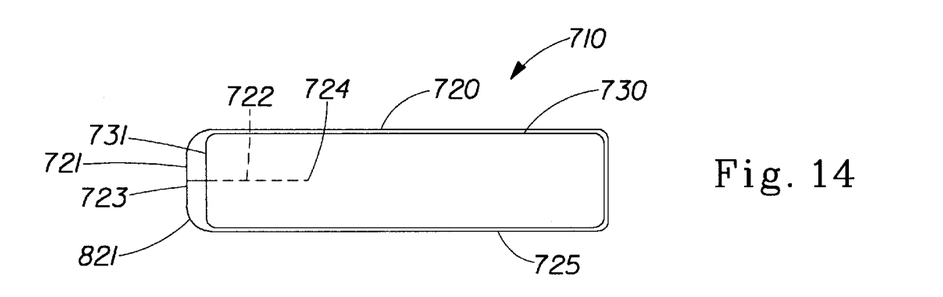
FIG. 14 is a top plan view of an embodiment a laminated structure of the present invention wherein the partible break extends from a shorter outside edge of the release strip.

In FIG. 14, there is shown an embodiment of the laminated structure of the present invention, which is generally indicated as 710. Embodiment 710 represents a laminated structure of the present invention comprising release strip 720 and adhesive coated strip 730. Release strip 720 further comprises tabs 721 and 821, extending from beyond the peripheral edge 731 of the adhesive coated strip 730, and partible break 722. Partible break 722 extends from the outside edge 723 of release strip 720 to interior point 724. Interior point 724 is located within the bounds of release strip 720 such that tab 721 remains contiguous with the general body 725 of release strip 720. Interior point 724 is located inside of the peripheral edges 731 of the adhesive coated strip 730. With the creation of two tabs 721 and 821, this embodiment may create an ease of separation the adhesive coated strip 730 from release strip 720 for both right and left handed user equally.

In the embodiments of the present invention, the partible breaks feature in the release strips result in the means for facilitating removal of the adhesive coated strips remaining with its respective body of the release strip. This feature provides only one piece of which to dispose and perhaps more importantly, elimination of small pieces which may be injurious in medical and oral applications.

Furthermore, producing the release strip partible breaks is amenable to manufacturing systems, requiring simple score lines. The partible breaks may either be scored fully through release strips or be a line of weakened strength enabling a tear along the partible breaks. This will provide a continuous web for manufacturing.

Examples for applications of the present invention include such items as transdermal patches, bandages, and teeth whitening strips. Transdermal patches generally consist of thin polyethylene film swatch having, on a first side, an adhesive for attaching the transdermal patch to the skin of the user at a desired location and a dose of medicament that will differ through the skin during the application period, and a second side for containment and protection of the adhesive and dose of medicament. Transdermal patches having the dose of medicament integrated into the matrix of the adhesive have recently been introduced.

The present invention may also be applied to common household bandages wherein current practice results in two piece of release film to discard.

The present invention may also be applied to teeth whitening strips which comprise a thin polyethylene film having a tacky gel coating applied thereon. The tacky gel coating is protected by a release film, typically a release treated substance, such as a fluoropolymer treated polyester, until preparation for application to the teeth by the user. It is especially desirable to avoid small pieces of discarded release film in the case of teeth whitening strips as the discarded pieces my find their way into the mouth. Furthermore, the tacky gel is a relatively thick viscous coating, especially in relation to the flimsy polyethylene film, and thus the product benefits from the use of a single piece of relatively rigid release film. In the absence of application of the present invention, the user would be requited to initiate the separation of the gel coated thin film using an implement, commonly a fingernail. Attempting to pick at an edge of the teeth whitening strip using the fingernail in order to provide a starting edge for subsequent separation of the release film may easily result in folding of the starting edge onto itself. Attempting to remedy such unintended folding can result in further wadding of the thin film, loss of gel, and undesirable fit and adhesion onto the teeth.

While particular embodiments of the present mention have been illustrated and described, it will be obvious to those skilled in the art that various changes and modifications may be made without departing from the spmit and scope of the invention, and it is intended to cover in the appended claims all such modifications that are within the scope of the invention.

What is claimed is:

1. A laminated structure, comprising:
    a substantially planar adhesive coated strip having a peripheral edge, a first side, and a second side;
    a release strip having an outside edge, a partible break; and
    wherein said first side of said adhesive coated strip is disposed upon said release strip and wherein said second side of said adhesive coated strip is exposed and wherein said partible break extends from a point on said outside edge beyond at least one said peripheral edge of said adhesive coated strip to an interior point on said release strip and wherein said partible break forms a deflectable tab, and wherein said release strip remains contiguous about said partible break subsequent to removal of said adhesive coated strip.

2. The laminated structure of claim 1, wherein deflection of said tab in a direction away from said adhesive coated strip generates a partial separation of said tab from general plane of said release strip at said partible break causing a portion of said peripheral edge of said adhesive coated strip to form a leading edge which is exposed fir grasping by a user to facilitate subsequent removal of said adhesive coated strip from said release strip.

3. The laminated structure of claim 1, wherein said partible break is a cut through said release strip.

4. The laminated structure of claim 1, wherein said partible break in said release strip extends beyond only one said peripheral edge of said adhesive coated strip.

5. The laminated structure of claim 1, wherein said partible break in said release strip extends beyond two said peripheral edges of said adhesive coated strip.

6. The laminated structure of claim 1 wherein said tab is of a size easily graspable by a user's fingers.

7. The laminated structure of claim 6 wherein said tab is from about 2 mm to about 10 mm wide.

8. The laminated structure of claim 1 wherein said coated strip is comprised of a polyethylene film.

9. The laminated structure of claim 1 wherein said release strip is comprised of a release treated substance.

10. The laminated structure of claim 1 wherein said release strip is comprised of a fluoropolymer treated polyester.

11. The laminated structure of claim 1, wherein the laminated structure is provided in the form of a tooth whitening strip.

12. The laminated structure of claim 1, wherein said partible break is a line of weakness.

13. The laminated structure of claim 1, wherein said strip is formed from a polymer.

14. A laminated structure, consisting of:
   a substantially planar adhesive coated strip having a peripheral edge;
   a release strip having an outside edge, a partible break; and
   wherein said adhesive coated strip is disposed upon said release strip and wherein said partible break extends from a point on said outside edge beyond at least one said peripheral edge of said adhesive coated strip to an interior point on said release strip and wherein said partible break forms a deflectable tab, and wherein said release strip remains contiguous about said partible break subsequent to removal of said adhesive coated strip.

15. A laminated structure, comprising:
   a substantially planar adhesive coated strip having a peripheral edge;
   a release strip having an outside edge, a partible break; and
   wherein said adhesive coated strip is disposed upon said release strip and wherein said partible break extends from a point on said outside edge beyond said peripheral edge of said adhesive coated strip to an interior point on said release strip and wherein said partible break forms a deflectable tab having a portion which does not overlie the adhesive coated strip, and wherein said release strip remains contiguous about said partible break subsequent to removal of said adhesive coated strip.

16. The laminated structure of claim 15, wherein said partible break in said release strip extends beyond only one said peripheral edge of said adhesive coated strip.

17. The laminated structure of claim 15, wherein said interior point of said release strip is disposed outside of said adhesive coated strip.

18. The laminated structure of claim 15 wherein said coated strip is comprised of a polyethylene film.

19. The laminated structure of claim 15 wherein said release strip is comprised of a release treated substance.

20. A method of using a laminated structure, comprising:
   (a) providing a laminated structure comprising:
      (i) a substantially planar adhesive coated strip having a peripheral edge, a first side, and a second side;
      (ii) a release strip having an outside edge, a partible break;
      (iii) wherein said first side of said adhesive coated strip is disposed upon said release strip and wherein said second side of adhesive coated strip is exposed and wherein said partible break extends from a point on said outside edge beyond at least one said peripheral edge of said adhesive coated strip to an interior point on said release strip and wherein said partible break forms a deflectable tab, and wherein said release strip remains contiguous about said partible break subsequent to removal of said adhesive coated strip;
   (b) deflecting said tab at said partible break; and
   (c) grasping said adhesive coated strip to remove said adhesive coated strip from said release strip.

21. A laminated structure, comprising:
   a substantially planar adhesive coated strip having a peripheral edge;
   a release strip having an outside edge and a partible break which is a line of weakness; and
   wherein said adhesive coated strip is disposed upon said release strip and wherein said partible break extends from a point on said outside edge beyond at least one said peripheral edge of said adhesive coated strip to an interior point on said release strip and wherein said partible break forms a deflectable tab, and wherein said release strip remains contiguous about said partible break subsequent to removal of said adhesive coated strip.

22. A laminated structure, comprising:
   a substantially planar adhesive coated strip having a peripheral edge;
   a release strip having an outside edge and a plurality of partible breaks; and
   wherein said adhesive coated strip is disposed upon said release strip and wherein said partible breaks extend from a point on said outside edge beyond at least one said peripheral edge of said adhesive coated strip to an interior point on said release strip and wherein said partible breaks form a deflectable tab, and wherein said release strip remains contiguous about said partible breaks subsequent to removal of said adhesive coated strip.

23. The laminated structure of claim 22, further comprising another substantially planar adhesive coated strip.

24. A laminated structure, comprising:
   a substantially planar adhesive coated strip having a peripheral edge; and
   a release strip having an outside edge and a partible break which is a line of weakness;
   wherein said adhesive strip is disposed upon said release strip such that said outside edge extends outwardly beyond said peripheral edge and said partible break extends inwardly from an edge of said release strip beyond at least one said peripheral edge of said adhesive coated strip to an interior point of said release strip, wherein said partible break is oriented such that when a rotational force is exerted on said outside edge, a portion of said adhesive coated strip will separate form said release strip to form a leading edge from a potion of said peripheral edge.

25. A laminated structure, comprising:

a substantially planar adhesive coated strip having a peripheral edge; and a release strip having an outside edge and a plurality of partible breaks;

wherein said adhesive strip is disposed upon said release strip such that said outside edge extends outwardly beyond said peripheral edge and said partible breaks extend inwardly from an edge of said release strip beyond at least one said peripheral edge of said adhesive coated strip to an interior point of said release strip, wherein said partible breaks are oriented such that when a rotational force is exerted on said outside edge, a portion of said adhesive coated strip will separate form said release strip to form a leading edge from a potion of said peripheral edge.

26. The laminated structure of claim 25, further comprising another substantially planar adhesive coated strip.

* * * * *